United States Patent [19]
Hunter

[11] Patent Number: 5,061,918
[45] Date of Patent: Oct. 29, 1991

[54] SOUND EMITTING DEVICE FOR BEHAVIOR MODIFICATION

[75] Inventor: Jon F. Hunter, College Station, Tex.

[73] Assignee: The Texas A&M University System, College Station, Tex.

[21] Appl. No.: 590,383

[22] Filed: Sep. 28, 1990

Related U.S. Application Data

[63] Continuation-in-part of Ser. No. 416,239, Oct. 2, 1989, abandoned.

[51] Int. Cl.$^5$ .................... G08B 21/00; A01K 15/00
[52] U.S. Cl. ..................................... 340/573; 119/29; 340/384 E
[58] Field of Search ............. 119/29; 340/573, 384 E; 381/190

[56] References Cited

U.S. PATENT DOCUMENTS

| | | | |
|---|---|---|---|
| 4,566,085 | 1/1986 | Weinberg | 340/384 E |
| 4,898,120 | 2/1990 | Brose | 119/29 |
| 4,929,924 | 5/1990 | Buyak et al. | 340/384 E |
| 4,947,795 | 8/1990 | Farkas | 119/29 |

*Primary Examiner*—Glen R. Swann, III
*Attorney, Agent, or Firm*—Arnold, White & Durkee

[57] ABSTRACT

A device for modifying the undesirable behavior of animals is disclosed which utilizes integrated circuitry to achieve a small size and light weight. Discrimination circuitry analyzes audible indications of undesirable animal behavior. Upon detection of undesirable behavior, sound generation circuitry produces a pattern of high-intensity sounds known to cause aversive behavior in animals. The staccato pattern varied, so that animal habituation to the sounds is avoided. Circuitry is provided for increasing or decreasing the effective intensity of the sounds according to the behavior of the animal over a previous time interval.

24 Claims, 7 Drawing Sheets

SOUND EMITTING DEVICE FOR BEHAVIOR MODIFICATION

This is a continuation in part of U.S. Patent Application Ser. No. 416,239 filed Oct. 2, 1989, now abandoned.

FIELD OF THE INVENTION

This invention relates generally to the field of behavior modification devices for controlling undesirable animal behavior. More particularly, the present invention relates to an improved apparatus and method for inhibiting animals from vocalization through the use of integrated circuitry to detect the vocalization, and then to deliver a pattern of impulse type sound bursts when the animal has ceased vocalization. The present invention is ideally suitable as a humane means for training dogs not to bark unnecessarily.

BACKGROUND OF THE INVENTION

The problem of barking dogs has been of continual concern in a variety of different situations. The incessant barking of a dog is undesirable not only because it may be a nuisance to people in the vicinity, but also because it is unhealthy for the barking dog. In a kennel or a clinical veterinary setting, it is desirable to discourage barking, since the barking of one dog is likely to arouse nearby dogs to do the same. In a residential environment, prolonged dog barking is very likely to be an annoyance to neighbors. Throughout the United States, an increasingly large number of communities have enacted "no-bark ordinances" whereby fines or other penalties may be imposed upon the owners of dogs if the owners cannot bring the barking to tolerable levels, durations, or frequencies.

As a result, a variety of techniques and devices have been devised to silence barking dogs. Although formal obedience training presents one possible solution, such training may be expensive, and may not be entirely effective in all dogs. Other approaches include behavioral modification devices which provide, for example, a vibrational response or an electrical shock to the dog in response to its barking. Perhaps the most drastic solution employed for the purposes of silencing barking dogs is the surgical removal of the dog's vocal cords.

The most serious drawback to the aforementioned electrical devices such as shock collars or hand-held electrical prods for discouraging dog barking is that they are, or may at least be so perceived by the general public, inhumane. The extreme measure of surgery to prevent a dog's barking is similarly repugnant. On the other hand, the less drastic measures, such as devices which provide an annoying mechanical vibration to discourage barking, may be quite costly and do not provide an entirely effective means for deterring barking. Moreover, bark-deterring devices are not always capable of effectively monitoring a dog's barking, nor of providing somewhat novel negative-reinforcement or distraction when barking occurs; this is essential to the lasting modification of a dog's behavior.

In order to monitor a dog's barking at all times, it is desirable that the anti-bark device be incorporated into a package which may be worn by the dog, as for example on a dog collar. Known anti-bark devices of this type typically suffer from the limitations that their electronic or mechanical components are housed in a large, inflexible, and cumbersome housing, precluding their use with small dogs. Furthermore, the housings are commonly not waterproof, making the known devices susceptible to damage from the elements. Also, anti-bark devices of the prior art commonly produce only a single negative-reinforcement response to barking. As a result, dogs may become habituated to the stimulus, thus limiting the effectiveness of the device.

Another anti-bark device available in the prior art is one invented by the inventor of the present invention and marketed by Humane Technology, Inc., College Station, Texas, under the trademark "PeaceMaker". The PeaceMaker utilizes CMOS integrated circuits and piezoelectric crystal elements to produce a single high-intensity burst of sound with a decrescendo pattern shortly after detection of a dog's bark. Vocalization discrimination circuitry distinguishes between a dog's barking and extraneous sounds of brief duration. The PeaceMaker is small enough to be fitted onto a dog's collar, and most of the high-frequency sound produced is inaudible to humans. While the PeaceMaker is capable of distinguishing between sounds on the basis of their duration, it does not analyze the frequencies of sounds detected in order to further prevent inadvertent activation. Furthermore, the production of only a single type of sound burst does not alleviate the problems of habituation to the negative reinforcement stimulus.

SUMMARY OF THE INVENTION

It is accordingly a principal object of the present invention to provide a behavior modifying apparatus which does not inflict physical harm or cause pain to an animal, yet is effective in deterring undesirable behavior, such as barking.

Another object of the present invention is to provide a behavior modifying apparatus which may be used to quiet barking dogs, or in an alternative embodiment to train dogs or repel aggressive dogs.

It is another object of the present invention to provide a behavior modifying device which is capable of varying its output such that habituation to the negative reinforcement is avoided.

It is a further object of the present invention to provide an apparatus which is automatic and self-contained, such that no human intervention is required during operation of the device.

It is another object of the invention to produce a behavior modification stimulus which is hardly noticeable to humans, but yet sufficiently irritating or distracting to dogs or other animals to negatively reinforce and discourage undesirable behavior.

It is yet another object of the present invention to provide a behavior modification device for animals which is small and lightweight, allowing it to be worn by small or large animals without causing discomfort.

It is still another object of the present invention to provide a behavior modification device which is self-powered, and capable of operating effectively for extended periods of time without maintenance or human intervention.

A further object of the present invention is to provide a behavior modification apparatus which is capable of distinguishing between certain environmental conditions and barking such that undesirable animal behavior is consistently accompanied by negative reinforcement, while no negative reinforcement is provided in response to extraneous environmental conditions.

Another object of the present invention is to provide a delayed behavior modification stimulus a predetermined time after detection and cessation of barking so that the auditory sensitivity of the animal is maximal.

Still another object of the present invention is to provide behavior modification stimuli to the animal at intervals approximating the repetition rate of alpha waves produced by the animal's brain, such that a distracting type stimulus is presented at a rate comparable to the frequency of higher central nervous system activity in a relaxed animal.

Another object of the present invention is to provide a behavior modification apparatus which is, in a general sense, useful in a variety of applications requiring negative reinforcement of or distraction from undesirable behavior.

According to the present invention, a device is provided which produces a high-intensity impulse type sound that is audible to dogs (but barely audible to humans) in response to undesirable behavior in an animal. The impulse type stimulus is of a type which is known to produce aversive responses in animals, thereby providing consistent negative reinforcement or distraction from the undesirable behavior. While the audible stimulus is of a high intensity, it does not inflict pain upon the animal to be conditioned. Nonetheless, the irritating quality of the stimulus is effective in deterring undesirable behavior.

The impulse sound generated by this device mimics naturally occuring sounds, such as those associated with the ionization of air, the crack of a whip, or the snapping of fingertips, known to cause aversive behavior in animals. The inventor's research indicates that dogs, upon hearing such electronically generated sounds, appear distracted, but exhibit no behavioral signs of pain. The American Conference of Governmental Industrial Hygienists has recommended that humans receive not more than 10,000 impact noises per day at a sound pressure level of 120-dB. A device for discouraging the barking of dogs designed in accordance with the present invention would produce approximately 116-dB of sound at the dog's ear; moreover, a dog being conditioned through the use of a device in accordance with the present invention would need to bark every three minutes for 24 hours in order to receive 10,000 impulse sounds. It is therefore believed that the present invention provides a humane technique to modify canine behavior.

Published auditory research has indicated that the sensitivity of the acoustic apparatus decreases during vocalization. For that reason, this invention is designed to wait until the tension on the stapedius and tensor tympani muscles have relaxed sufficiently to make the auditory reception mechanism maximally sensitive to incoming sounds. These muscles are relaxed 150 to 200 milliseconds following the termination of vocalization.

The resonant frequency of a device for modifying canine behavior in accordance with the present invention is preferably chosen to be at the upper limits of human audibility. The inventor has determined that this is a frequency range to which dogs are highly sensitive. The interval between each impulse sound is approximately 100 milliseconds; such a repetition rate corresponds to 10 Hz, the frequency of alpha brain waves. So that habituation to the device is avoided, circuitry is provided for increasing the number of impulse sounds generated by the device in proportion to the frequency of barking. The circuitry is also designed to allow for a "free barking episode" once every four hours; such an occasional bark is not followed by an impulse sound. In addition, the device is capable of distinguishing between episodes of the undesirable behavior and other environmental conditions, so that false responses of the device are minimized. This discrimination circuitry monitors the duration of undesirable behavior as a parameter for identifying actual episodes of the behavior, making the device less susceptible to inadvertent activation by extraneous sounds, such as scratching at the collar. Additionally, the sound detection sensor is physically positioned to respond principally to vibrations of the upper respiratory tract (trachea) of the dog and to minimize activation of the collar by other environmental sounds.

The device achieves its small size, light weight, and minimal power consumption characteristics through the use of CMOS circuitry, a MOSFET high voltage spike generator, and a piezoelectric crystal having an appropriate resonant frequency. Extended operation of the device is facilitated through the use of a lithium power source.

DETAILED DESCRIPTION OF SPECIFIC EMBODIMENTS OF THE INVENTION

Figure 1:
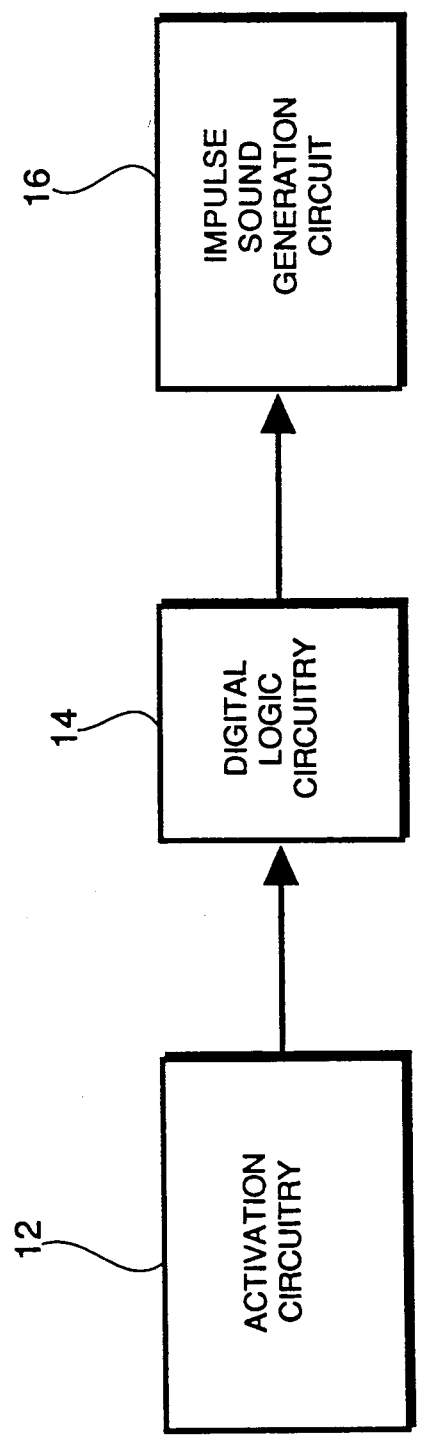
FIG. 1 is a block diagram illustrating the main components of a device in accordance with the present invention.

In FIG. 1, a block diagram illustrating the major components of a behavioral modification device in accordance with the present invention is shown. An activation circuit 12 functions to activate the behavior modification device. Activation circuit 12 may be a simple manually operated switch for activating the device upon demand, or a sensor receiver circuit for detecting and discriminating external signals to selectively activate the device, as will be hereinafter described. Digital logic circuit 14 is responsive to activation from circuit 12 in generating either, in one embodiment, pseudo-random or programmable staccato patterns of electrical signals, or in another embodiment, a variable number of equally-spaced electrical signals, approximately 150 milliseconds after being activated by circuit 12. The pseudo-random or equally-spaced signals activate an impulse sound generation circuit 16. Impulse sound generation circuit 16 produces a series of audible clicks corresponding to the pseudo-random or equally-spaced patterns of signals provided thereto by digital logic circuit 14.

Figure 2:
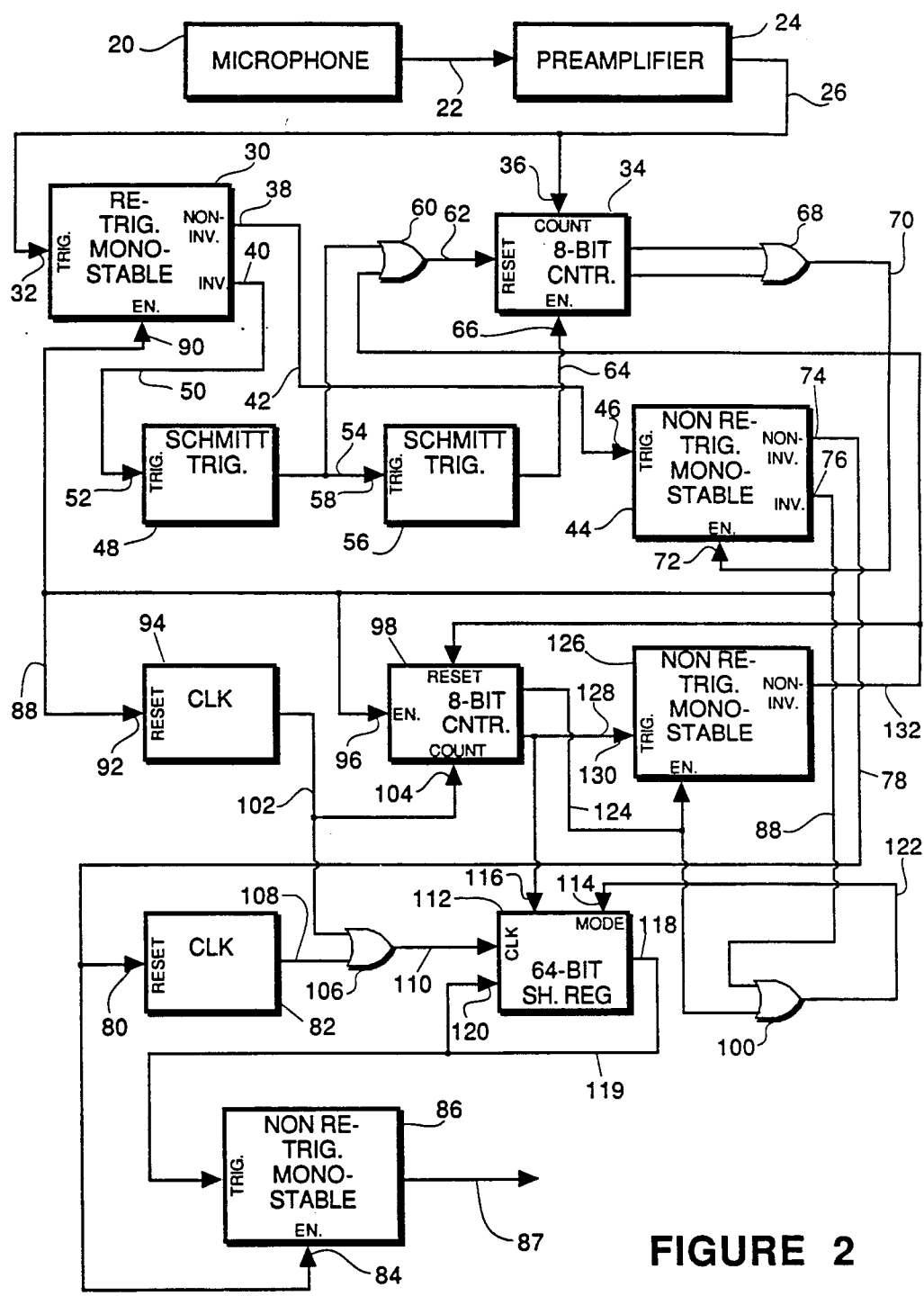
FIG. 2 is a block diagram generally illustrating the circuitry of one embodiment of the present invention.

Referring now to FIG. 2, a more detailed block diagram of one embodiment of the present invention is shown. The circuits of FIG. 2 are preferably constructed using conventional, commercially available digital logic devices, such as digital binary counters, shift registers, logic gates and the like. For the purposes of the following description, electrical signals conducted within this circuit shall be described as having either a logical "high" level, corresponding to a "1" value or an "on" condition, or a logical "low" level, corresponding to a "0" value or an "off" condition. If the devices used are of the well known CMOS (complementary metal-oxide semiconductor) type, powered with a 6-volt power supply voltage, for example, a "high" logic level signal corresponds to a voltage of approximately 5-volts to 6-volts, while a "low" logic level signal corresponds to a voltage of approximately 0-volts.

In the embodiment of FIG. 2, the circuitry is adapted to be responsive to the barking of a dog, to produce a pseudo-random staccato pattern of audible impulses using a piezoelectric crystal element having a resonant frequency of approximately 17,000-Hz. The logic components shown in FIG. 2 are preferably disposed upon a flexible circuit board (not shown), and the entire assembly is then incorporated into a molded plastic part of a dog's collar, as will be hereinafter described in greater detail.

A microphone 20 is utilized to sense the dog's vocal cord vibrations propagated to the ventral surface of the dog's neck. In a preferred embodiment of the present invention, microphone 20 is a piezoelectric transducer or the like, characterized by its small size and light weight. The voltage signal generated by the piezoelectric microphone 20 is fed to a preamplifier 24, on line 22. In a preferred embodiment, preamplifier 24 is a common-emitter transistor circuit, well known in the art of circuit design. When the dog barks, the piezoelectric microphone signal on line 22 causes preamplifier 24 to turn on and off. Threshold and frequency response characteristics of preamplifier 24 may be adapted by varying biasing resistors and capacitors in the preamplifier circuit, or by changing the mechanical configuration of the piezoelectric crystal element 20. In the preferred embodiment, microphone 20 and preamplifier 24 are preferably configured to pass signals having frequencies within the range of 250-Hz to 1000-Hz with high gain, while also having a minimal quiescent energy consumption, on the order of less than 1-microamp.

An amplifier output line 26 carries a signal consisting of a sequence of pulses which activate the remainder of the digital logic circuitry to be hereinafter described.

Line 26 is coupled to a triggering input 32 of a retriggerable monostable multivibrator 30, as well as to a Count input 36 of an 8-bit binary counter 34. The initial sound associated with the dog's barking causes a series of pulses to be conducted on line 26 to trigger retriggerable multivibrator 30. Multivibrator 30 has a non-inverted output 38 and an inverted output 40. Non-inverted output 38 of monostable multivibrator 30 is conducted, on line 42 to the triggering input 46 of a non-retriggerable monostable multivibrator 44. Inverted output 40 of monostable multivibrator 30 is conducted, on line 50, to the triggering input 52 of a Schmitt trigger 48. In response to the occurrence of a falling-edge transition at Schmitt trigger input 52, an 80-mSec pulse is generated at the output of Schmitt trigger 48, which is conducted on line 54 to the triggering input 58 of a second Schmitt trigger 56.

The output of Schmitt trigger 48 is also conducted by line 54 to one input of an OR gate 60, the output of which is coupled, via line 62 to the RESET input of binary counter 34. The output of Schmitt trigger 56 is provided, via line 64 to an ENABLE input 66 of counter 34. Of the eight outputs bit-0 through bit-7 of counter 34, only the outputs corresponding to bit-5 and bit-6 are used, these being coupled to the inputs of an OR gate 68. The output of OR gate 68 is conducted by line 70 to an ENABLE input 72 of monostable multivibrator 44.

Monostable multivibrator 44 has a non-inverted output 74 and an inverted output 76. Non-inverted output 74 is coupled, via line 78 to a RESET input 80 of a clock 82, as well as to an ENABLE input 84 of a non-retriggerable monostable multivibrator 86. Inverted output of multivibrator 44 is conducted on line 88 to an ENABLE input 90 of multivibrator 30, to a RESET input 92 of a second clock 94, to an ENABLE input 96 of a second 8-bit counter 98, and to one input of an OR gate 100.

Clock 94 produces a high-frequency clocking signal on line 102 which is received at an INCREMENT input 104 of counter 98, and also at one input of an OR gate 106. Clock 82 produces a substantially slower clocking signal on line 108, which is received at a second input of OR gate 106. The output of OR gate 106 is coupled, via line 110 to the CLOCK input of a 64-bit shift register 112. Shift register 112 is operable in either of two modes, selectable via MODE input 114. In a first mode, corresponding to a logical high level MODE input, bits are shifted into the register from input 116 and shifted out from SHIFT OUT output 118. In a second mode, selected with a logical low level MODE input, bits are shifted in from input 120, and shifted out from SHIFT OUT output 118. In either mode, shifting is controlled via the CLOCK input of register 112, which receives its input signal from OR gate 106, as previously noted. MODE input 114 of shift register 112 receives line 122, which carries the output signal from OR gate 100.

Bit-6 (the next to highest order bit) from counter 98 is conducted by line 124 to an ENABLE input of a non-retriggerable monostable multivibrator 126. Bit-0 (the lowest order bit) from counter 98 is conducted, via line 128, to a triggering input 130 of monostable multivibrator 126. The output of multivibrator 126 is coupled, via line 132, to a RESET input of counter 98, and also to a second input of OR gate 60.

Non-retriggerable monostable multivibrator 86 is triggered by output 118 of shift register 112. In response to triggering, multivibrator 86 produces a 0.5-mSec pulse on its output line 87. Output line 87 is coupled to sound burst generation circuit 16, not shown in FIG. 2.

Figure 3:
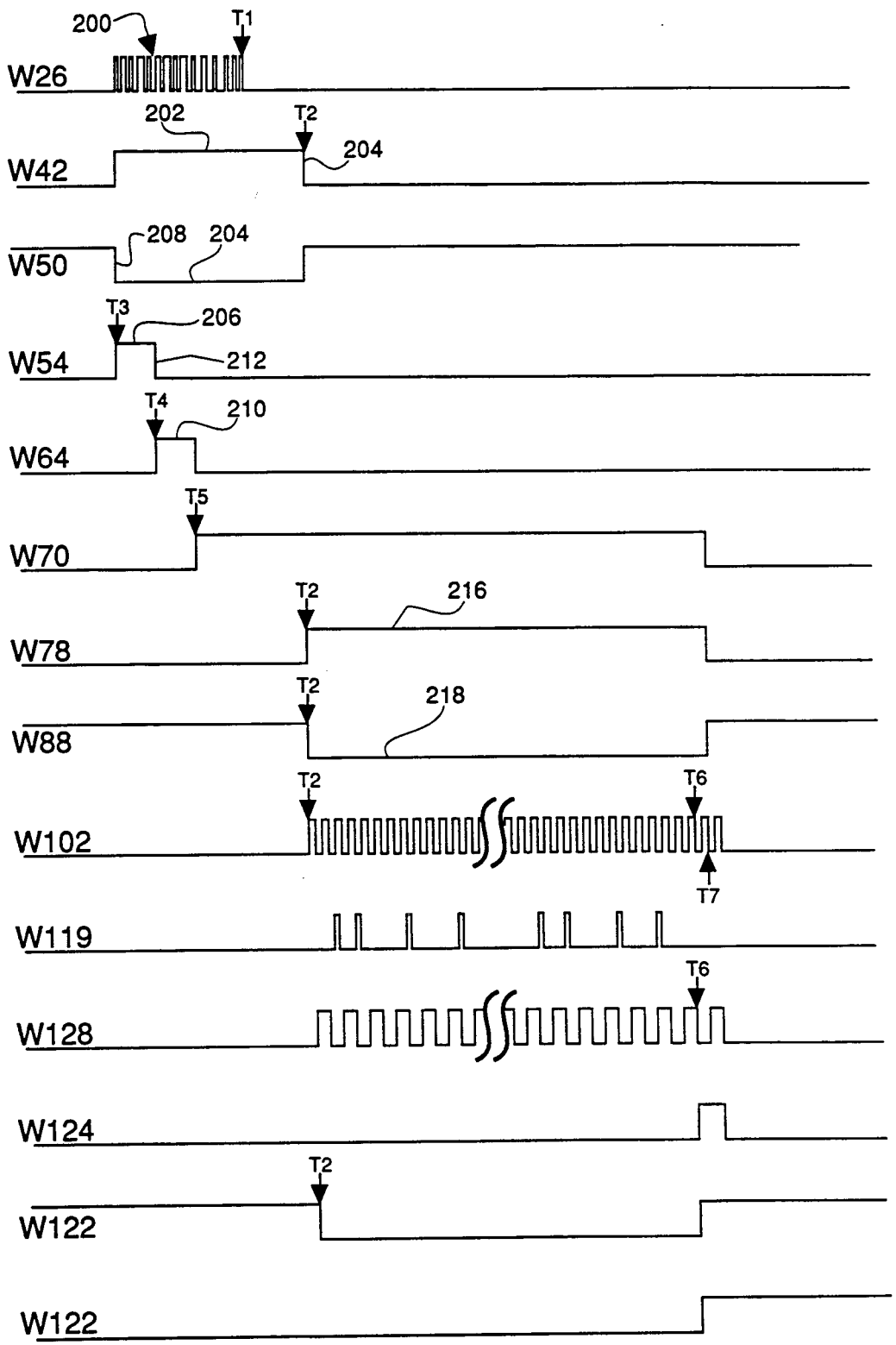
FIG. 3 is a timing diagram illustrating the interrelationship between electrical signals produced within the circuitry of FIG. 2.

In FIG. 3, a timing diagram showing the interrelationships of various digital signals in the circuit of FIG. 2 is provided. In FIG. 3, the wave form W42 corresponds to the electrical signal conducted on line 42 in the diagram of FIG. 2. Similarly, wave form W50 corresponds to the electrical signal on line 50, W54 to the wave form on line 54, and so on.

With reference to FIGS. 2 and 3, operation of the circuit of FIG. 2 proceeds as follows: First, as noted previously, barking sounds input to preamplifier 24 to create a sequence of activation pulses on line 26. These pulses are denoted generally as 200 in wave form W26 of FIG. 3. Since monostable multivibrator 30 is retriggerable, each pulse in the sequence 200 appearing on line 26 has the effect of restarting a 400-mSec pulse produced at inverted and noninverted outputs 38 and 40, respectively. Thus, a high-level pulse 202 in wave form W42 and a low-level pulse 204 in wave form W50 will begin as soon as the first of activation pulses 200 is received at triggering input 32 from line 26, and will continue for approximately 400-mSec after the vocalization has ceased. If the time denoted as T1 in FIG. 3 corresponds to the arrival at input 32 of the last of activation pulses 400 at input 32, then the time denoted as T2 corresponds to a time 400-mSec later than time T1.

With continued reference to FIGS. 2 and 3, recall that line 50 connects the inverted output of monostable multivibrator 30 to the triggering input of Schmitt trigger 48. In response to a falling edge transition (from a high level to a low level) at input 52 to Schmitt trigger 48, an 80-mSec pulse is produced at the output of Schmitt trigger 48. In wave form W54 of FIG. 3, an 80-mSec pulse 206 begins at time T3, corresponding to the falling edge 208 of wave form W50. Recall that line 54 connects the output of Schmitt trigger 48 to the triggering input 58 of Schmitt trigger 56. A falling edge detected at input 58 causes a 120-mSec pulse to be produced at the output of Schmitt trigger 56, on line 64. In wave form W64, a 120-mSec pulse 210 begins at time T4, corresponding to the falling edge 212 of pulse 206.

Line 64 is coupled to the ENABLE input of 8-bit counter 34; thus, during pulse 210 in wave form W64, counter 34 is enabled. When counter 34 is enabled, a pulse received at its COUNT input 36 causes the count value of counter 34 to be incremented by one. COUNT input 36 receives line 26; thus, when counter 34 is enabled by 120-mSec pulse 210 from Schmitt trigger 56, the number of pulses 200 occurring during pulse 210 are counted.

The vocalizations of a dog are known to have a major frequency typically in the range from 250-Hz to 1000-Hz. Thus, if pulses 200 are produced as a result of a dog's vocalization, these pulses will also occur with a frequency of between 250-Hz and 1000-Hz. Digital logic circuit 14 determines the frequency of activation pulses 200 by counting the number of pulses 200 occurring during a 120-mSec time interval. If pulses 200 are produced at the frequencies of a dog's vocalization, between 25 and 100 of them will occur in a 120-mSec period. During 120-mSec pulse 210, if counter 34 counts between 30 and 120 pulses from sequence 200, then pulses 200 are occurring at a frequency of between 250-Hz and 1000-Hz, the frequency range of a dog's vocalization.

As discussed above, bit-6 and bit-7 (the second and third highest order bit positions) of the output of counter 34 are coupled to the inputs of OR gate 68. Bit position 5 corresponds to a binary value of 32; that is, if bit position 5 is a "one", the counter value of counter 34 is at least 32. Similarly, bit position 6 corresponds to a binary value of 64, so that if bit position 6 is a "one", the counter value of counter 34 is at least 64. As will be appreciated by one of ordinary skill in digital logic design, if both bit-5 and bit-6 of counter 34 are "ones", the counter value lies between 32 and 127. Within acceptable limits of approximation, therefore, if either bit-5 or bit-6, or both, of counter 34 are "one" at the end of pulse 210 which enables counter 34, then there is a strong indication that the sequence of activation pulses 200 has a major frequency in the range of a dog's bark.

To illustrate the operation of the circuitry of FIG. 2, assume that pulses 200 of FIG. 3 have a frequency of 500-Hz. During 120-mSec pulse 210, therefore, 60 of pulses 200 will be counted by counter 34, and bit-5 will become a "one". The output of OR gate 68 will accordingly go high, as indicated at time T5 in wave form W70 of FIG. 3. Line 70 couples the output of OR gate 68 to the ENABLE input of monostable multivibrator 44; thus at time T5, multivibrator 44 is enabled.

As previously noted, output pulses 202 and 204 from retriggerable multivibrator 30 extend to time T2, 400-mSec after cessation of pulses 200. At time T2, the falling edge 214 of pulse 202 is detected at triggering input 46 of multivibrator 44. As a result, as shown in wave forms W78 and W88 of FIG. 3, output pulses denoted in FIG. 3 as 216 and 218 are produced at the inverted and non-inverted outputs 74 and 76 of multivibrator 44, at time T2. As previously described, the inverted output 76 of multivibrator 44 is coupled, via line 88, to RESET input 92 of clock 94, and to ENABLE input 96 of counter 98. At time T2, therefore, the RESET signal to clock 94 is deasserted, allowing clock 94 to produce a clocking signal at its output, on line 102; in addition, counter 98 is enabled. The clocking signal produced by clock 94 is shown as wave form W102 in FIG. 3.

Also at time T2, pulse 216 from the non-inverted output of multivibrator 44 is applied, via line 78, to RESET input 80 of clock 82, and to ENABLE input 84 of multivibrator 86.

In this preferred embodiment of the present invention, clock 94 is chosen to have a frequency of 200-Hz, so that one clock pulse is produced every 5-mSec. These clock pulses (wave form W102) are simultaneously applied, via line 102, to COUNT input 104 of 8-bit counter 98 and to the CLOCK input of 64-bit shift register 112 (via OR gate 106 and line 110). Thus, with each clock pulse of wave form W102, the count value of 8-bit counter is incremented by one, and the contents of shift register 112 are shifted one position.

As explained previously, shift register 112 is operable in either of two modes. In the first, selected when MODE input 114 to shift register 112 is at a logical low level, bits are shifted from left to right in the shifter in a circulating manner, one position per pulse applied to the CLOCK input, such that bits shifted out of the last position on the right are shifted into the first position on the left. In the second mode, selected with a logical high MODE input 114, the value (zero or one) applied to input 116 is added to the contents of shift register 112 with each clock pulse. In FIG. 2, MODE input 114 of shift register 112 receives the signal from line 122, and line 122 carries the output of OR gate 100. From FIG. 3, it can be seen that OR gate 100 performs the logical OR function of wave forms W88 and W124, so that at time T2, MODE input 114 is low, and shift register 112 operates in the aforementioned circulating mode.

A bit position of shift register 112 is set to "one" each time a dog's vocalization is detected by circuitry 14. As will be hereinafter explained, if the dog has barked at any time within the previous four hours, at time T2 at least some of the bits in shift register 112 will be set to "one". Since register 112 is operating, starting at time T2, in the circulating mode, each clock pulse from clock 94 (wave form W102) will cause one bit from shift register 112 to be shifted out from output 118, and recirculated back to input 120. In addition, as shown in FIG. 2, output 118 from shift register 112 is coupled to the triggering input of monostable multivibrator 86.

Multivibrator 86 is configured to produce an output pulse of approximately 0.5-mSec duration upon triggering. Thus, each time a "one" is shifted out of output 118 from shift register 112, multivibrator 86 is triggered.

Additionally, each clock pulse from clock 102 is counted by counter 98, counter 98 having been enabled at time T2 as previously noted. Counter 98 is incremented in response to the falling edge of each clock pulse produced by clock 94. At the falling edge of the 64th clock pulse, at the time denoted as T6 in FIG. 3, bit-6 of the counter goes high; bit-6 of counter 98 is conducted, on line 124, to the ENABLE input of multivibrator 126, and to one input of OR gate 100. Thus, at time T6, multivibrator 126 is enabled, and the output of OR gate 100 goes high. As a result of the output signal from OR gate 100 going high, the mode of shift register 112 is changed.

Due to this change in mode of register 112 at time T6, on the rising edge of the 65th and 66th clock pulses on line 102 a "zero" and a "one", respectively, are added to the contents of register 112. These bits to be added are provided by the bit-0 output from counter 98, supplied on line 128 to input 116 of register 112. On the falling edge of the 65th clock pulse, at time T7, both bit-0 and bit-6 (wave forms W128 and W124, respectively) are high. Bit-6 being high causes multivibrator 126 to be enabled, as previously noted; when bit-0 gets low, on the next clock pulse, this causes multivibrator 126 to be triggered, causing a logical high signal to be produced on line 132 (see wave form W132 in FIG. 3). As a result, counters 34 and 98, monostable multivibrator 44, and clock 94 are each reset, at time T8. The circuit is then ready to be activated by another animal vocalization, and the process is repeated.

Impulse type bursts of sound are produced in response to the triggering of monostable multivibrator 86, which occurs when a "one" is shifted out of shift register 112. Each time the circuit of FIG. 2 is activated, a "zero" and a "one" are added to the contents of shift register 112, during the 65th and 66th pulses from clock 94, as previously described. As a result, as more animal vocalizations are detected, a corresponding number of "ones" will be stored in random positions within shift register 112. As more "ones" are stored in shift register 112, multivibrator 86 is triggered a corresponding number of times during each circulation of shift register 112. In this way, a dog that is barking more frequently will be subjected to a greater number of audio impulses than is a dog that barks less frequently.

Furthermore, the circuit of FIG. 2 includes provisions for allowing one "free" bark (without a resultant sequence of audio impulses) if the dog has refrained from barking for four or more hours. Clock 82 is in continuous operation, provided that a bark has not occurred. In this embodiment, clock 82 has a cycle of approximately four minutes. Each time the output, on line 108, of clock 82 makes a low-to-high transition, a zero is inserted into the contents of register 112. If the dog has not barked in approximately four hours, the contents of register 112 will be all "zeros". Then, when a vocalization is detected, the circulation of the contents of register 112 will produce no "ones" at output 118, on line 119, and therefore multivibrator 86 is not triggered and no audio impulses are produced.

Figure 4:
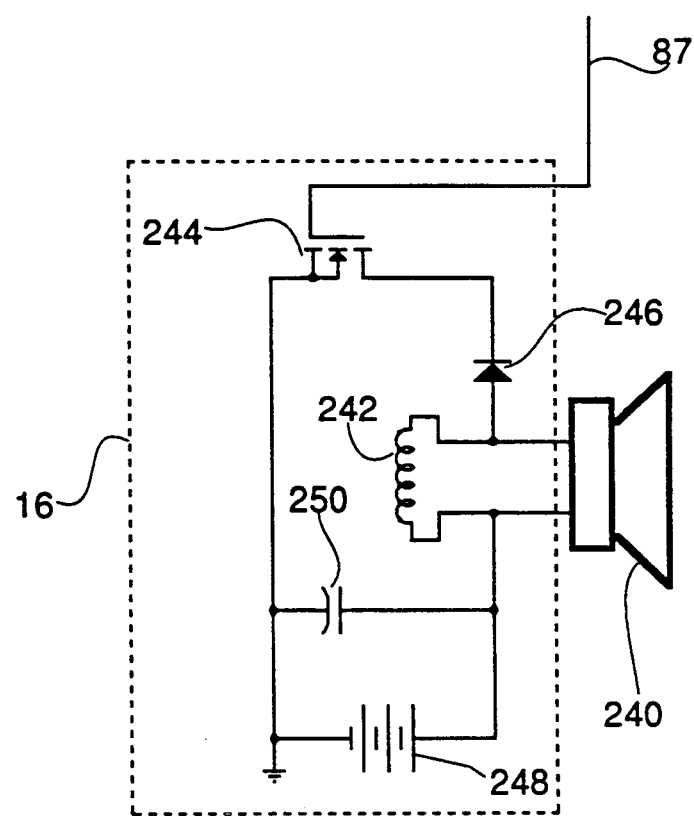
FIG. 4 is a schematic diagram of decrescendo sound burst generation circuitry in accordance with one embodiment of the present invention.

The circuit 16 used to produce the discrete, high-intensity, high frequency, impulse sound is shown in FIG. 4. In the present embodiment of the invention, a piezoelectric crystal speaker 240 connected in parallel with inductor 242 resonate following application of the 0.5-msec pulse produced by multivibrator 86. The 0.5-msec pulse provided to the circuit of FIG. 4 applied to the gate of MOS field-effect transistor (MOSFET) 244.

As shown in FIG. 4, when MOSFET 244 is rendered conductive by a 0.5-msec pulse, a path through the parallel connection of speaker 240 and inductor 242, and through a diode 246, is established between a 6.0-volt battery power supply 248 and ground.

Battery 248 is preferably a series connection of two 3.0-volt lithium batteries having small size and light weight. While lithium batteries have superior shelf-life and power capacity per unit weight as compared with conventional alkaline or carbon batteries, they are also known to have limited instantaneous current capabilities, and are typically used only in continuous, low-current applications, such as in digital watches and the like. Accordingly, impulse sound generation circuit 16 in the present invention employs an electrolytic capacitor 250 to enhance the current delivery capabilities of lithium battery supply 248.

During quiescent operation of circuit 16 (i.e., the steady-stage, when no impulses are being produced), no current flows through transistor 244, and capacitor 250 is charged to the voltage of battery supply 248. The charging rate of capacitor 250 is determined by the resistance of voltage source 248 and the capacitance of capacitor 250. For example, if capacitor 250 has a capacitance of 220-$\mu$F and the voltage source has an effective resistance of 10-$\Omega$, the voltage on capacitor 250 will be charged to nearly 99% of the voltage of battery supply 248 in 11-msec. Thereafter, large currents can be drawn from the battery/capacitor combination for brief periods by partial discharge of capacitor 250.

When 0.5-msec pulses appear on line 84, MOSFET 244 is rendered conductive for that time, drawing current from the batteries 248 and capacitor 250 through the parallel combination of speaker 240 and inductor 242, and through protective diode 246. This current causes speaker 240 and inductor 242 to resonate at a frequency which is chosen to be at the upper limit of human audibility, but easily detected by dogs. In the preferred embodiment, piezoelectric speaker 240 and inductor 242 are chosen such that a resonant frequency of approximately 17,000 Hz is achieved. Short impulse sounds are generated by circuit 16 in a pattern determined by circuit 14.

Figure 5:
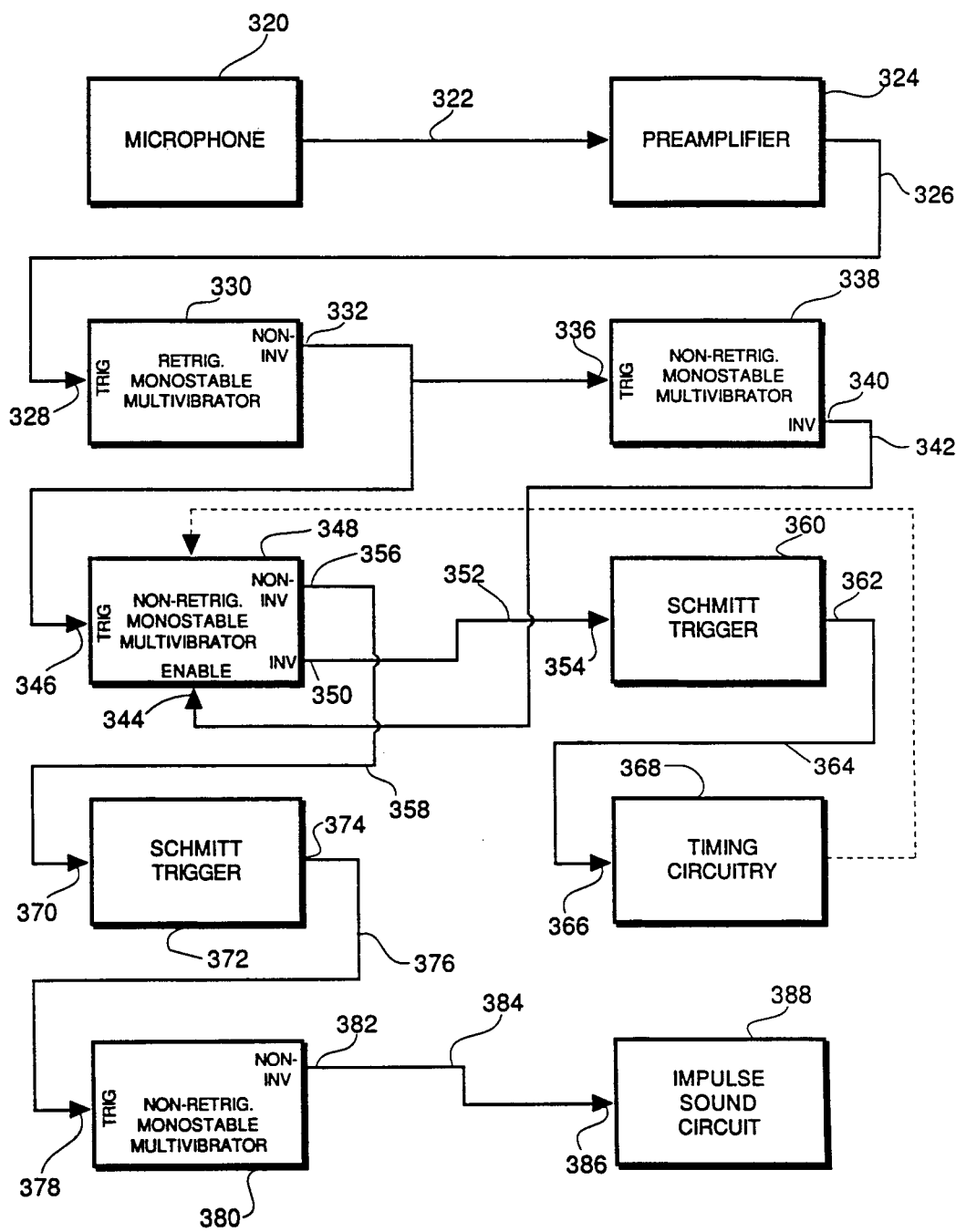
FIG. 5 is a block diagram generally illustrating the circuitry of a second embodiment of the present invention.

Referring now to FIG. 5, a block diagram of another embodiment of the present invention is shown. As with the circuit of the previously disclosed embodiment, the circuits of FIG. 5 are constructed using conventional, commercially available digit logic devices or a custom integrated circuit.

In the embodiment of FIG. 5, the circuitry is adapted to be responsive to the barking of a dog and to produce a variable number of equally spaced electrical signals. Such signals, in turn, activate an impulse sound generation circuit consisting of a piezoelectric crystal connected in parallel to an inductor; this circuit when excited by a high voltage impulse resonates at approximately 17,000 Hz. As with the previously disclosed embodiment, the logic components shown in FIG. 5 are affixed to either a rigid or flexible printed circuit board (not shown), and the entire assembly is then incorporated into a molded plastic part (not shown) which in itself forms all or part of the entire dog collar.

A microphone 320 is utilized to sense the dog's vocal cords vibrations that are propagated to the ventral surface of the neck. As in the previously disclosed embodiment, microphone 320 is a piezoelectric transducer or the like, characterized by its small size and light weight. The voltage signal generated by the piezoelectric microphone 320 is fed to a preamplifier 324, on line 322. In the present embodiment, preamplifier 324 is a common-emitter transistor circuit, well known in the art of circuit design. When the dog barks, the piezoelectric microphone signal on line 322 causes preamplifier 324 to turn on and off. Threshold and frequency response characteristics of preamplifier 324 may be adapted by varying biasing resistors and capacitors in the preamplifier circuit, or by changing the mechanical configuration of the piezoelectric crystal element 320. In the preferred embodiment, microphone 320 and preamplifier 324 are preferably configured to pass signals have frequencies within the range of 250 Hz to 1000 Hz with high gain, while also having a minimal quiescent energy consumption, on the order of less than 1 microamp.

A preamplifier output line 326 carries a signal consisting of a sequence of pulses which activate the remainder of the circuitry to be hereinafter described.

The sound associated with the dog's barking causes a series of pulses to be conducted on line 326 to a rising-edge trigger input 328 of retriggerable monostable multivibrator 330. The non-inverted output 332 of monostable multivibrator 330 is conducted, on line 334 to the rising-edge trigger input 336 of a non-retriggerable monostable multivibrator 338. The minimum duration of the high level signal carried on line 334 is approximately 50 milliseconds. In response to triggering, monostable multivibrator 338 produces a pulse lasting approximately 110 milliseconds.

The inverted output 340 of monostable multivibrator 338 is coupled, via line 342, to an ENABLE input 344 of another non-retriggerable monostable multivibrator 348. When this ENABLE signal is at a high level, multivibrator 348 can be triggered by a falling-edge signal on line 334 from monostable multivibrator 330. This condition exists if the duration of the pulses on line 326 from preamplifier 324 continue for approximately 60 milliseconds, thereby providing retriggering of monostable multivibrator 330 so that the output signal from this circuit continues for longer than 110 milliseconds.

The non-inverted output 356 of monostable multivibrator 348 is coupled to a CONTROL input 370 of a Schmitt Trigger 372. Schmitt Trigger 372 is configured to function as a gated oscillator such that when the CONTROL signal is at a high level, the oscillator generates pulses following a delay of approximately 150 milliseconds.

The output signal from Schmitt Trigger 372 is conducted on line 376 to the rising-edge triggered input 378 of a non-retriggerable, monostable multivibrator 380. Upon triggering, multivibrator 380 produces pulses of approximately 0.5 millisecond duration at non-inverted output 382. The signal on line 384 is coupled to an impulse sound generation circuit 388 shown in FIG. 4.

The duration of the CONTROL signal on line 370 to Schmitt Trigger 372 and thus the number of pulses ultimately transmitted on lines 376 and 384 is controlled by a timing circuit 368 which regulates the pulse duration of the signals on lines 352 and 358 from multivibrator 348. Timing circuit 368 adjusts the duration of the pulses on lines 352 and 358 based on the history of barking episodes. If the dog has not barked for approximately four hours, then the signal on line 358 from monostable multivibrator 348 lasts for only about 50 milliseconds. This duration of signal is inadequate in duration to activate Schmitt Trigger 372 and, in turn, monostable multivibrator 380. Under this condition, no sound is produced by the device. When barking episodes occur within a relatively short time span (e.g., a few minutes), the pulse generated by monostable multivibrator 348 lasts for approximately 2000 milliseconds; this causes approximately 19 equally spaced impulse sounds to be generated. If barking episodes occur relatively infrequently, but more often than once every four hours, some intermediate number of impulse sounds (1 to 18) are generated depending on the specific history of barking. To accomplish this variability in response to barking, a Schmitt Trigger 360 generates a brief low level pulse (approximately 200 milliseconds in duration) on line 364 to alter the point of operation of a common emitter transistor timing circuit 368. By altering this transistor's conductance, the pulse duration of monostable multivibrator 348 is changed. Operation of timing circuit 368 will be more fully described below with reference to FIG. 7.

Figure 6:
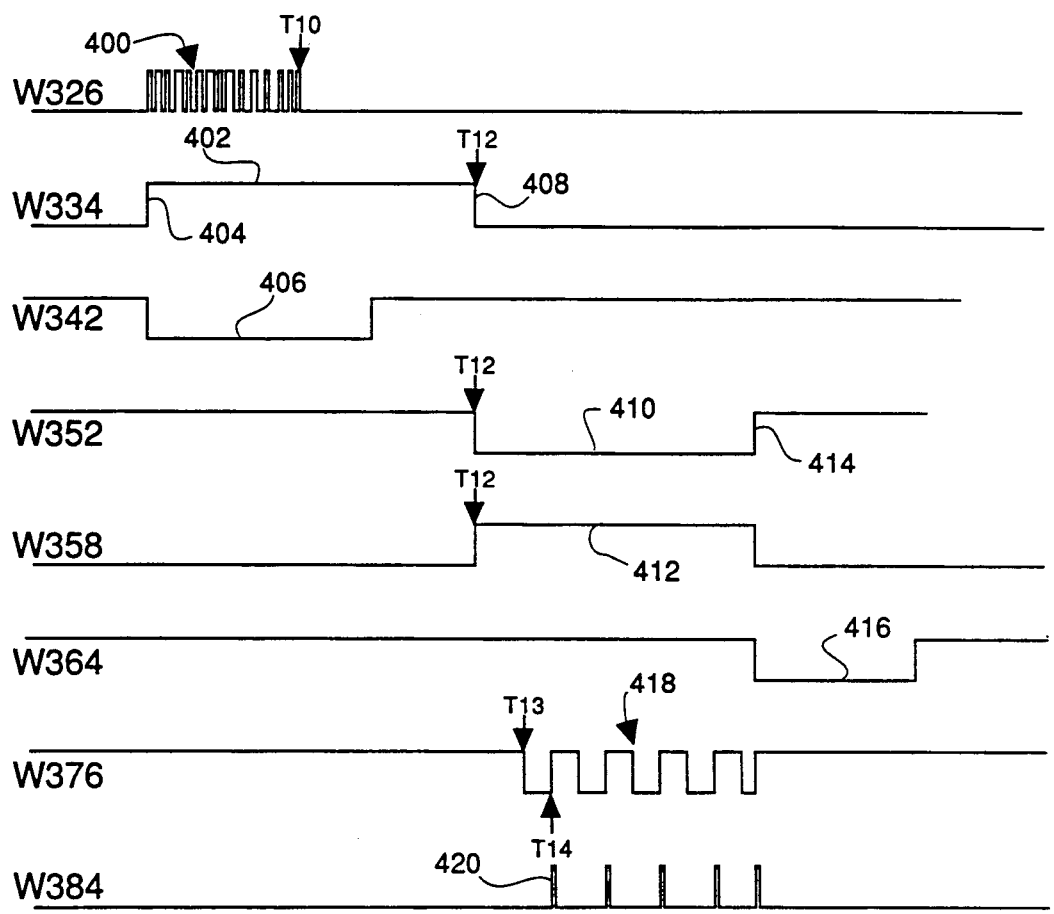
FIG. 6 is a timing diagram illustration the interrelationships between electrical signals produced within the circuitry of FIG. 5.

In FIG. 6, a timing diagram showing the interrelationships of various digital signals in the circuit of FIG. 5 is provided. In FIG. 6, the wave form W342 corresponds to the electrical signal conducted on line 342 in the diagram of FIG. 5. Similarly, wave form W352 corresponds to the electrical signal on line 352, W358 to the wave form on line 358, and so on.

With reference to FIGS. 5 and 6, operation of the circuit of FIG. 5 proceeds as follows: First, as noted previously, barking sounds input to preamplifier 324 create a sequence of activation pulses on line 326. These pulses are denoted generally as 400 in wave form W326 in FIG. 6. Since monostable multivibrator 330 is retriggerable, each pulse in the sequence 400 appearing on line 326 has the effect of restarting a 50-msec pulse produced at the non-inverted output 332. Thus, a high-level pulse 402 in wave form W334 will begin as soon as the first of activation pulses 400 is received at triggering input 328 from line 326, and will continue for approximately 50-msec after the vocalization has ceased. If the time denoted as T10 in FIG. 6 corresponds to the arrival at input 328 of the last of activation pulses 400 at input 328, then the time denoted as T12 corresponds to a time 50-msec later than time T10.

With continued reference to FIGS. 5 and 6, monostable multivibrator 338 is triggered by the rising-edge 404 of waveform W334. Once triggered, multivibrator 338 generates a 110 millisecond pulse 406 at the inverted output 340. If the retriggerable monostable multivibrator continues to be triggered or is retriggered such that the time from initial triggering to time T12 is greater than 110 milliseconds, then the falling edge 408 of waveform W334 will trigger monostable multivibrator 348.

The duration of pulses 410 and 412 at the inverted output 350 and non-inverted output 356 of monostable multivibrator 348 is dependent upon the previous history of the dog's barking. If the dog has not barked within the past four hours, this pulse duration will be 50 milliseconds; if barking is occurring every 3 to 4 minutes, this pulse duration can reach a maximum duration of 2000 milliseconds.

When the signal on line 358 is at a high level, Schmitt Trigger 372 will be activated to generate a series of pulses with a repetition rate of 10 per second. The first transition in this pulse sequence 418 will occur at time T13. The difference in time between T13 and T12 is approximately 100 milliseconds. The first rising-edge of this pulse sequence 418 occurs at time T14; the difference in time between T14 and T13 is 50 milliseconds. Thus, the first rising-edge of this pulse sequence 418 does not occur until approximately 200 milliseconds after the dog has stopped barking.

Monostable multivibrator 380 generates a 0.5 millisecond pulse 420 in response to rising-edge signals of waveform W376. If multiple pulses 420 are generated, these pulses are repeated every 100 milliseconds except for the last pulse in the sequence which may occur sooner depending on the duration of pulse 412 (waveform W358).

Figure 7:
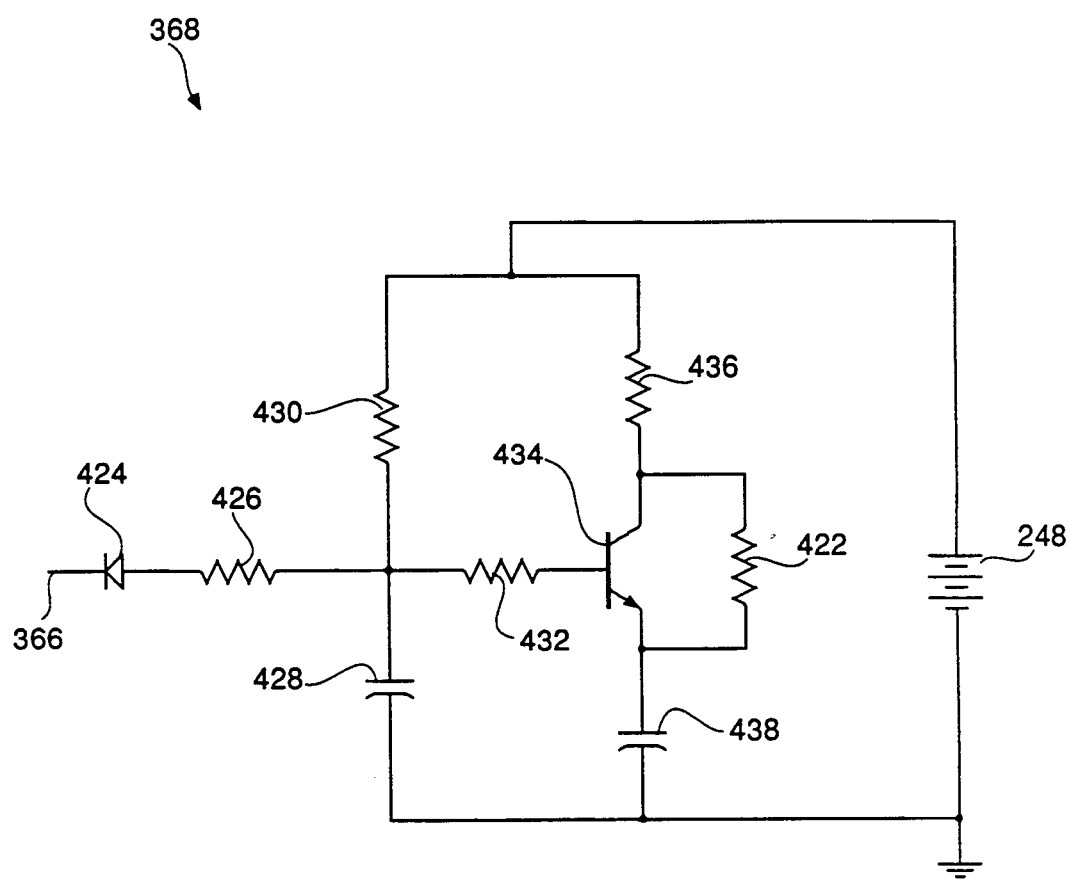
FIG. 7 is a schematic diagram of the timing control circuit that determines the number of impulses generated by the circuit of FIG. 5.

Referring now also to FIG. 7, the rising-edge 414 of the wave form W352 activates Schmitt Trigger 360 to cause a 200 millisecond pulse 416. This signal 416 causes capacitor 428 in FIG. 7 to partially discharge through resistor 426 and diode 424. Partial discharge of capacitor 428 decreases the conductance of transistor 434 which effectively increases the resistance of the resistive network connected between the positive terminal of battery supply 248 and capacitor 438. Capacitor 438 and associated resistive network (comprising resistors 422, and 436 and transistor 434) serve as timing elements controlling the duration of pulses 410 and 412 generated by monostable multivibrator 348. During periods when the output of Schmitt Trigger 360 remains at a high level (no barking), capacitor 428 charges up through resistor 430; this in turn, causes transistor 434 to increase its conductance. When capacitor 428 is fully charged, the resistive network associated with capacitor 438 has minimal resistance. These various situations cause the duration of pulses 412 and 410 to vary between 50 and 2000 milliseconds depending on the history of barking. A dog that is barking more frequently will be subjected to a greater number of impulse sounds upon barking than a dog that barks less frequently.

In the embodiments disclosed herein, the integrated circuits used in the circuitry of FIGS. 2 or 5, the battery 248, microphone 20 or 320, speaker 240, and other discrete components (such as MOSFET 244 and capacitor 250) are mounted on a printed circuit board. This assembly is incorporated into a molded plastic part of a dog collar, attached to a nylon strip having portions of a molded plastic buckle on each end thereof. A "triglide" may be included to allow for adjustment of the collar's length. The assembly is sufficiently flexible to conform to the shape of a dog's neck. The weight of the electronic package and the buckles are preferably arranged to cause microphone 20 or 320 to be positioned, during use, over the ventral surface of a dog's neck, with speaker 240 positioned in close proximity to the dog's ear.

From the foregoing detailed description of a specific preferred embodiment of the present invention, it should be apparent that a device for distracting a dog from barking has been disclosed which is effective, but humane. The present invention is particularly well-suited to such applications, due to the fact that it may be implemented using small, lightweight and durable components. Further miniaturization of the disclosed device has been contemplated through the use of surface-mounted circuit technology, or through the use of custom integrated circuit components.

In a general sense, it may be appreciated that the present invention could be adapted for use in various applications which call for distracting an animal/man from an undesirable behavior (e.g., snoring (human), roosting birds or aggressive dogs) or as an animal training device.

While specific references have been made in the foregoing description to timing values, circuitry component values, voltages, frequencies and the like, it is to be understood that various substitutions, modifications, or alterations may be made therein, depending upon the application, without departing from the spirit and scope of the present invention as defined in the appended claims.

What is claimed is:

1. A method for modifying the undesirable behavior of animals, comprising the steps of:

periodically right-shifting the contents of a shift register comprising a plurality of binary storage locations, such that for each periodic right-shift, the binary value stored in each location of said shift register is shifted one location to the right, the binary value of the left-most location being set to zero;

detecting episodes of undesirable behavior comprising repeated occurrences of said undesirable behavior in succession;

generating an activation signal each time an episode of undesirable behavior is detected;

storing a record of each activation signal in the left-most and second left-most of said plurality of binary storage locations in said periodically shifting shift register, said record comprising a one and a zero, respectively, in said left-most and second left-most locations, such that the location in said shift register of a given stored record of a given activation signal in said shift register is at any time determined by the time of detection of an episode of undesirable behavior corresponding to said given activation signal and by the rate of periodic shifting of said shift register;

circulating the contents of the shift register once, at a fast rate, a predetermined time after generation of each activation signal; and producing a composite audio pulse during each said fast circulation of the shift register;

wherein the composite pulse comprises a sequence of decrescent audio impulses of a predetermined frequency, the temporal pattern and number of impulses in the sequence being determined by the the respective locations of said stored records of activation signals in the shift register;

and wherein said composite pulse having a frequency and intensity known to be distracting to animals, such that animals are discouraged from exhibiting said undesirable behavior when said composite pulse is produced.

2. The method of claim 1, wherein the undesirable behavior is the barking of a dog.

3. The method of claim 1, wherein the predetermined frequency of the impulses is chosen to be distracting to dogs.

4. The method of claim 1, wherein the detecting step comprises:

bandpass filtering a raw audio signal;

determining the frequency of the bandpass filtered audio signal;

determining the duration of the bandpass filtered audio signal; and comparing the duration and frequency of the bandpass filtered audi signal to known duration and frequency characteristics of the audible indication of the undesirable behavior.

5. A device for modifying the behavior of animals, comprising:

a microphone for sensing audio signals and producing a raw audio signal;

a frequency detector coupled to the microphone for producing an activation signal in response to detection of raw audio signals within a predetermined range of frequencies and durations;

a shift register having a plurality of bit storage locations therein, said shift register being periodically right-shifted such that for each periodic shifting the binary value stored in each bit storage location is shifted one location to the right, the left-most location of said shift register being set to zero, said shift register being coupled to the frequency detector, for storing a two-bit flag in the first and second left-most locations in said shift register in response to each activation signal produced by the frequency detector, the location of each two-bit flag being determined, at any time, by the time each respective activation signal is produced and the slow circulation rate of said shift register;

delay means, coupled to the frequency detector, responsive to the production of an activation signal, for shifting the contents of the shift register once, at a fast rate, in a circulating manner a predetermined time after receiving the activation signal;

decrescendo sound generation means coupled to the shift register, for producing a composite audio pulse in response to the circulation of bits in the shift register, the composite audio pulse comprising a plurality of sequentially occurring decrescent audio impulses, wherein, for each bit flag circulated in the shift register, a corresponding audio impulse is produced in the composite audio pulse;

such that the number and temporal pattern of decrescent audio impulses constituting a composite audio pulse is determined by the respective positions of two-bit flags stored in the shift register;

said composite audio pulse having a frequency and intensity known to be distracting to animals, such that said animals' behavior is modified when said audio pulse is produced.

6. A device according to claim 5, further comprising means for periodically removing a bit flag from the shift register, such that the number of stored bit flags is reduced in response to the absence of activation signals.

7. A device according to claim 5, wherein the decrescendo sound generation means comprises a piezoelectric crystal transducer having a predetermined resonant frequency, a power source, and a gating transistor coupled to the shift register, such that during circulation of bits in the shift register, bursts of power are applied to the piezoelectric crystal transducer in a pattern corresponding to the locations of stored bit flags in the shift register.

8. A device according to claim 7, wherein the resonant frequency of the piezoelectric crystal transducer is selected to be at a frequency that is distracting to the animal.

9. A device according to claim 7, wherein the power source comprises a low-current lithium battery and a capacitor connected in parallel, such that charge stored on the capacitor increases the amount of current delivered to the piezoelectric crystal transducer during each burst of power.

10. A device according to claim 5, wherein the frequency detector comprises a filtering amplifier and a counter, and wherein the filtering amplifier bandpass filters the raw audio signal, and produces a sequence of pulses having a frequency corresponding to the filtered audio signal, and wherein the counter counts the number of pulses in the sequence during a predetermined time interval.

11. A device according to claim 5, wherein the elements comprising the device are disposed upon a flexible dog collar such that when fitted onto a dog, the weight distribution of the dog collar and device automatically causes the microphone to be positioned over the ventral surface of a dog's neck and the piezoelectric crystal transducer to be situated in close proximity to the dog's ear.

12. A method for discouraging undesirable behavior in an animal, comprising the steps of:

detecting an episode of the undesirable behavior, each episode comprising a plurality of occurrences of said undesirable behavior in sucession;

making a temporary record of the detection of episodes of undesirable behavior;

producing, at a predetermined time after detection of an episode of undesirable behavior, a composite audio pulse at a frequency known to be distracting to the animal;

varying the number and temporal pattern of separate audio impulses which constitute the composite audio pulse in proportion to the time elapsed between detected episodes of said undesirable behavior during a previous predetermined history period;

such that the effective intensity of the composite pulse varies inversely with the amount of time elapsed between detected episodes during the history period, and such that habituation to the composite audio pulses is minimized.

13. A device for discouraging undesirable behavior in an animal, comprising:

means for detecting episodes of said undesirable behavior, each episode comprising a plurality of occurrences of said undesirable behavior in succession;

means for making a record of each episode of said undesirable behavior detected within a previous, predetermined history period;

means for generating a composite audio pulse at a frequency distracting to the animal, at a predetermined time after detection of an episode of the undesirable behavior, such that the animal is discouraged from further engaging in said undesirable behavior;

means for varying the temporal pattern of separate audio impulses comprising the composite audio pulse;

means for varying the number of separate audio impulses which constitute the composite audio pulse in proportion to the number of times that an episode of the undesirable behavior has been detected during the predetermined history period.

14. A method for modifying undesirable behavior of an animal, comprising the steps of:

detecting episodes of undesirable behavior, each episode comprising a plurality of audible indications of said undesirable behavior in succession;

generating a variable number of impulse type sounds in response to detection of each respective episode, said variable number being determined by time elapsed between prior detected episodes undesirable behavior; delaying the first of said variable number of sounds for a predetermined time period following cessation of said each respective episode such that said animal's auditory apparatus is most sensitive to sound when said variable number of sounds are generated;

wherein said variable number of sounds are provided at a repetition rate which is distracting to said animal.

15. The method of claim 14, wherein the undesirable behavior is the barking of a dog.

16. The method of claim 14, wherein the predetermined repetition rate approximates the frequency of alpha brain waves in dogs.

17. The method of claim 14, wherein the step of detecting further comprises the steps of: bandpass filtering a raw audio signal; determining the duration of said bandpass filtered audio signal; and comparing the duration of said bandpass filtered audio signal to known duration characteristics of said audible indication of said undesirable behavior.

18. A device for modifying the behavior of an animal, comprising:
a microphone for sensing audio signals produced by said animal;
means for generating an activation signal in response to detection of raw audio signals within a predetermined range of frequencies and durations corresponding to an episode of undesirable behavior of said animal;
means responsive to said activation signal for generating an impulse sound known to be distracting to said animal;
means for establishing a delay between generation of said activation signal and generation of said impulse sound; and
means for varying the number of impulse sounds generated in response to each activation signal such that a greater number of sounds are delivered as the elapsed time between previously detected episodes decreases, and such that an occasional episode may occur without activating the sound generating circuit.

19. A device according to claim 18, wherein said impulse sound generation means comprises:
a piezoelectric crystal transducer connected in parallel with an inductor, said parallel combination having a predetermined resonant frequency;
a power source; and
a gating transistor coupled to a monostable multivibrator;
such that each pulse from said multivibrator causes a high voltage pulse to be applied to said piezoelectric crystal transducer and inductor combination.

20. A device according to claim 19, wherein said piezoelectric crystal transducer emits sound that is distracting to said animal.

21. A device according to claim 19, wherein said power source comprises a low-current lithium battery and a capacitor connected in parallel, such that charge stored on the capacitor increases the amount of current delivered to said impulse sound generation means during said high voltage pulse.

22. A device according to claim 18, wherein said device is disposed upon a flexible dog collar such that when fitted onto a dog, the weight distribution of said dog collar and said device causes said microphone to be positioned over the ventral surface of said dog's neck and said piezoelectric crystal transducer to be situated in close proximity to said dog's ear.

23. A method of discouraging undesirable behavior in an animal, comprising the steps of:
detecting episodes of the undesirable behavior comprising a plurality of occurrences of said undesirable behavior in succession;
producing, at a predetermined time after detection of an episode of undesirable behavior, a composite sound pattern comprising a variable number of impulse sounds known to be distracting to said animal, said variable number of impulse sounds determining an effective energy level of said composite sound pattern;
varying the number of said impulse sounds in said composite audio pattern in inverse proportion to the elapsed time between prior detected episodes of said undesirable behavior, such that the effective energy of said composite audio pattern varies with the elapsed time between prior detected episodes of undesirable behavior; and varying the pattern of said impulse sounds in said composite sound pattern such that habituation to the composite audio pulses is less likely.

24. A device for discouraging undesirable behavior in an animal, comprising:
means for detecting episodes of said undesirable behavior, each episode comprising a plurality of occurrences of said undesirable behavior in succession;
means for generating a composite sound pattern comprising a variable number of impulse sounds proven to be distracting to the animal;
means for delivering a first of said variable number of impulse sounds at a predetermined time after detection of an episode of the undesirable behavior;
wherein said variable number of impulse sounds in said composite sound pattern is determined by the time elapsed between prior detected episodes of the undesirable behavior.

* * * * *

UNITED STATES PATENT AND TRADEMARK OFFICE
CERTIFICATE OF CORRECTION

PATENT NO. : 5,061,918
DATED : October 29, 1991
INVENTOR(S) : Jon F. Hunter

It is certified that error appears in the above-identified patent and that said Letters Patent is hereby corrected as shown below:

Column 4, line 36, delete "illustration" and insert
-- illustrating --.
Column 10, line 41, delete "17,000 Hz" and insert
-- 17,000-Hz --.
Column 10, line 48, delete "digit" and insert -- digital --.
Column 10, line 57, delete "17,000 Hz" and insert
-- 17,000-Hz --.
Column 11, line 12, delete "have" and insert -- having --.
Column 11, line 13, delete "250 Hz" and insert -- 250-Hz --.
Column 11, line 13, delete 1000 Hz" and insert -- 1000-Hz --.
Column 14, line 64, delete "audi" and insert -- audio --.
Column 16, line 17, delete "sucession;" and insert
-- succession; --.

Signed and Sealed this

Sixteenth Day of March, 1993

Attest:

STEPHEN G. KUNIN

*Attesting Officer*   *Acting Commissioner of Patents and Trademarks*